United States Patent [19]

Kuntman

[11] Patent Number: 4,490,720

[45] Date of Patent: Dec. 25, 1984

[54] MULTIPULSE SIGNAL PROCESSING FOR RADAR SYSTEM

[75] Inventor: Daryal Kuntman, South Pompano Beach, Fla.

[73] Assignee: The Bendix Corporation, Southfield, Mich.

[21] Appl. No.: 249,288

[22] Filed: Mar. 30, 1981

[51] Int. Cl.³ .............................................. G01S 7/28
[52] U.S. Cl. ............................ 343/17.1 PW; 343/5 W
[58] Field of Search .......... 343/5 W, 13 R, 17.1 PW, 343/114.5, 5 SW, 5 DP, 7.3, 17.1 R, 17

[56] References Cited

U.S. PATENT DOCUMENTS

| | | | |
|---|---|---|---|
| 2,946,050 | 7/1960 | Wathen | 343/13 R |
| 3,518,415 | 6/1970 | Gutleber | 343/13 R |
| 3,893,117 | 7/1975 | Nirasawa et al. | 343/17.1 R |
| 3,964,064 | 6/1976 | Brandao et al. | 343/17 X |
| 4,206,461 | 6/1980 | Pease et al. | 343/5 DP |
| 4,249,174 | 2/1981 | Lucchi et al. | 343/5 W |
| 4,303,920 | 12/1981 | Mortimer | 343/5 SW X |

FOREIGN PATENT DOCUMENTS 52-49792  4/1977  Japan ........................ 343/17.1 PW

*Primary Examiner*—Maynard R. Wilbur
*Assistant Examiner*—M. R. Gordon
*Attorney, Agent, or Firm*—W. G. Christoforo; Bruce L. Lamb

[57] ABSTRACT

A radar system alternately transmits relatively short and long pulses. The video signals corresponding to the target returns from consecutive pulse transmissions are converted to digital format and then integrated except that radar return signals from targets within a first range resulting from long pulse transmissions are not used for integration.

3 Claims, 12 Drawing Figures

U.S. Patent    Dec. 25, 1984    Sheet 1 of 4    4,490,720
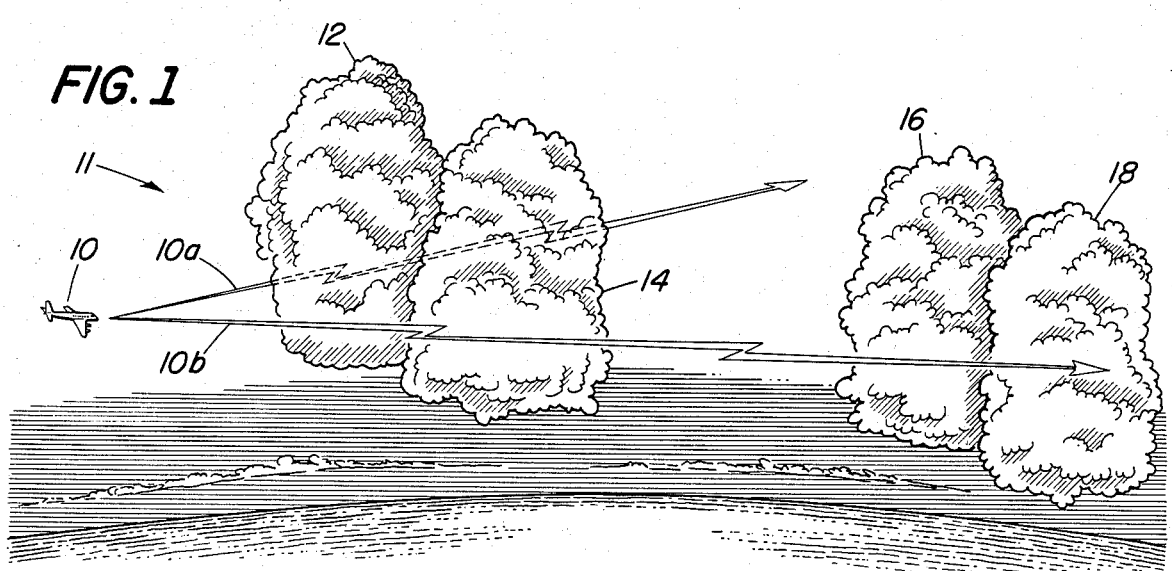
FIG. 1
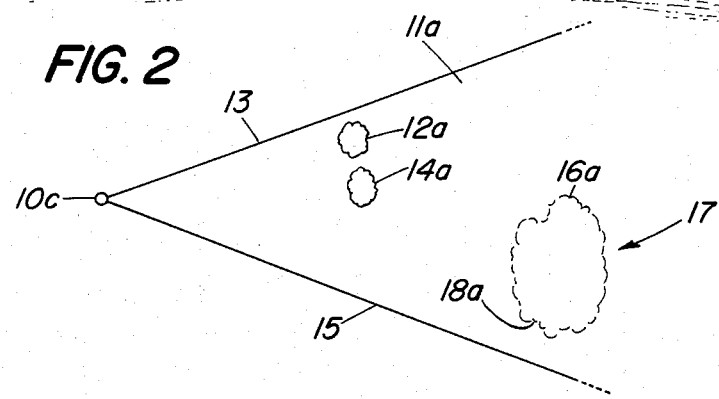
FIG. 2
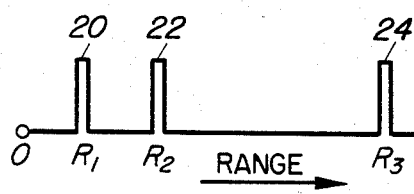
FIG. 3
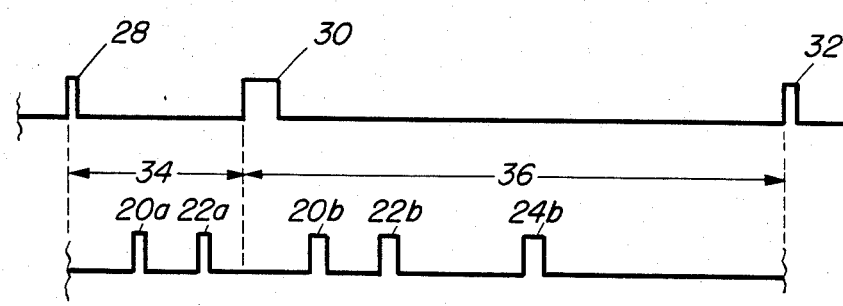
FIG. 4A
FIG. 4B
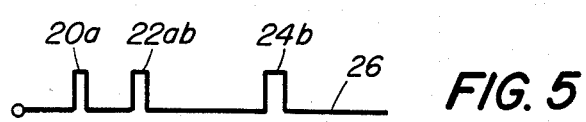
FIG. 5

MULTIPULSE SIGNAL PROCESSING FOR RADAR SYSTEM

This invention relates to radar systems, and more particularly to airborne radar systems for detecting weather targets such as thunderstorms and other weather phenomena which can endanger aircraft performance.

Airborne weather radar systems generally provide a plan position indication (PPI) on a cathode ray tube of the space into which an aircraft is flying, complete with echo returns from cells of intense weather such as thunderstorms. The pilot, having this display, can plan his course to fly around or between such cells to provide a safer and more comfortable ride for his passengers. It is thus important that the radar system provide optimum target resolution so that the display information on which the pilot bases the aircraft course is reasonably accurate.

It is known that the resolution of radar targets improves as the radar system transmitted pulsewidth, which evokes a radar echo from targets, decreases. It would thus seem that narrow transmitted pulsewidths would provide optimized target echoes. However, assuming a constant transmitted pulse amplitude, a valid assumption since transmitted pulse amplitude is normally chosen to be the maximum practical amplitude for the particular radar system under all conditions, the energy content of a narrow pulse is less than the energy content of a wider pulse so that echo returns from narrow pulses are relatively weaker. Conversely, echo returns from wider pulses are relatively stronger. Thus, although narrow transmitted pulses provide for good radar target resolution, they are useful only over a limited range since the return from a distant target as the result of being illuminated by a narrow radar pulse may be below the receiver detection level. On the other hand, wider pulses, having a greater energy content, are effective over an extended range but provide poorer target resolution.

The above described phenomena are well known in the art. In order to overcome the problems of narrow pulse range and wide pulse resolution, prior art weather radar systems are equipped to transmit both narrow and wide pulses at the option of the pilot. In order to observe close-in weather targets, those targets of most immediate concern, the pilot will choose a narrow pulse, usually a 6 microsecond wide pulse, for a well resolved display of weather cells. In order to obtain a longer range view of the space into which he is flying, a pilot will select a wider pulse, usually an 18 microsecond wide pulse. Although resolution will be decreased, the resulting display can be helpful for extended course planning purposes.

SUMMARY OF THE INVENTION

The present invention is a radar system which processes the detected video in the radar system receiver resulting from radar echoes received from radar targets to provide optimized target resolution of both short or long range targets. Very briefly, a radar system includes means to transmit long and short radar pulses alternately. In the embodiments to be described, the radar system is exemplified as an airborne weather radar system in which the narrow pulse is 6 microseconds wide and the wide pulse is 18 microseconds wide. The detected video, corresponding to echo returns, in the embodiments described, is reduced to digital format by an analog to digital converter. The digitized radar return signals from successive pulse transmissions are then integrated except that signal returns from targets lying within a first range resulting from a long pulse transmission are not used. This is accomplished by interrupting the operation of the integrator during the time period that such target returns are normally incident on the radar antenna. In addition, since it is highly unlikely that targets lying beyond a second range will return a detectable signal as a result of being illuminated by the lower power narrow pulse, in the embodiment to be described, the interpulse period subsequent to the transmission of such narrow pulse is truncated at a time corresponding to that second range to make more effective use of time. As an alternative, of course, this interpulse period need not be truncated but no significant new data would be gained thereby, assuming the second range is properly chosen. The integration product is used for display. Thus, the display will show short range targets with relatively high resolution. Although long range targets will be shown with relatively less resolution, the response of the radar receiver to long range targets will be improved. Intermediate range targets will be shown in accordance with the strength of their radar visibility and the resolution of all targets will be optimized regardless of range without the need for operator manipulation of system controls.

The main advantage of the present invention is that it provides radar weather echo return data suitable for display on a cathode ray tube, or for other suitable use, as an optimized informational unit in accordance with radar return data short and long pulse transmissions.

BRIEF DESCRIPTION OF THE DRAWINGS

FIG. 1 illustrates an airborne weather radar carrying aircraft moving into an area of storm activity.

FIG. 2 shows the weather radar display the aircraft of FIG. 1 would have if the present invention is incorporated in its weather radar system.

FIG. 3 represents a Type A radar display showing three idealized targets at various ranges from a radar system.

FIGS. 4A and 4B comprise a timing chart which is helpful in explaining the form of radar returns from short and long pulse transmissions.

FIG. 5 shows a composite radar return of the three targets of FIG. 3.

DESCRIPTION OF THE PREFERRED EMBODIMENT

Figure 9:
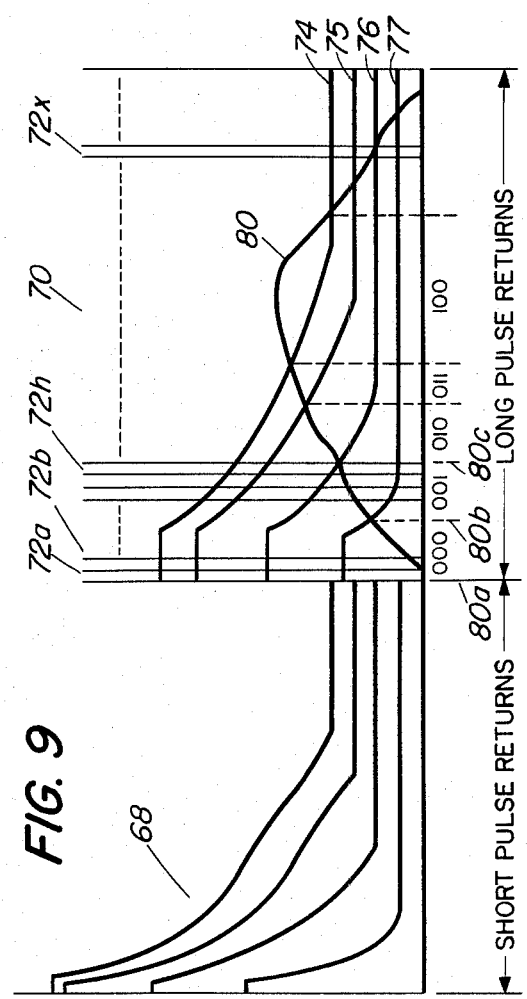
FIG. 9 comprises curves of the thresholds used in this embodiment of the invention and are helpful in explaining the operation of the A/D converter and the sensitivity timing control circuitry.

Referring first to FIG. 1, there is seen an aircraft 10 flying into its field of interest 11, that is, the segment volume of air space generally forward of the aircraft which the pilot intends to traverse and which is illuminated by a radar system on the aircraft. Located in field of interest 11, for example, are four distinct storm cells 12, 14, 16 and 18. It is assumed for sake of illustration that the storm cells are identical in extent and intensity, that cells 12, 14 are located the same distance to the left of the aircraft line-of-sight, or longitudinal axis extended, as cells 16–18 are to the right of the line-of-sight and that the distance between cells 12 and 14 is identical to the distance between cells 16 and 18. In other words, it is assumed that cells 12 and 14 are identical in all respects to cells 16 and 18 except that the former cells are relatively close to aircraft 10 and to the left of its line-of-sight and the latter cells are relatively far from the aircraft and to the right of its line-of-sight. It is also assumed that there is onboard the aircraft a weather radar made according to the present invention.

It is desirable and important to the comfort and safety of the aircraft and its passengers that the pilot know the true extent of the various storm cells so that he can maneuver the aircraft through the calmer portions of the field of interest and to avoid the severe weather of the storm cells. Since the pilot's knowledge of the weather conditions within the field of interest is primarily obtained from the weather radar, it is also desirable and important that the weather radar provide a well resolved display of the weather, which in this example is comprised of the various storm cells illustrated. As has been discussed above, a well resolved display will generally result if the radar pulses comprising the radar transmitted beams, here exemplified by beam 10a generally directed toward cells 12 and 14 and beam 10b generally directed toward cells 16 and 18, are relatively narrow, it being understood that the radar beam continuously scans through segmental field of interest 11 and that targets within the field of interest reflect radar return signals to the airborne weather radar system on aircraft 10 in the standard manner. However, due to maximum pulse power limitations, narrow pulses are low in total power content and hence are useful in obtaining detectable radar returns only over a relatively short range. Long radar pulses, which are thus higher in total power content will elicit detectable radar returns from longer ranged targets but, unfortunately, long radar pulses produce radar return signals which cannot be well resolved. The present invention comprises an improvement to a radar system whereby close range targets are well resolved while longer range targets, although less well resolved than the close range targets, are illuminated with sufficient power to elicit a detectable return signal.

A typical radar PPI display produced by the means of the present invention illustrating the resulting target presentation of FIG. 1 is shown at FIG. 2, reference to which should now be made. Field of interest 11 of FIG. 1 is here represented by segment 11a defined by lines 13 and 15 radiating from a center 10c which here represents aircraft 10 of FIG. 1. (For ease of understanding, target trace contouring is not shown but would be present in a display using data processed by the present embodiment.) As should be obvious, target traces 12a, 14a, 16a and 18a respectively, represent cells 12, 14, 16 and 18 of FIG. 1. As will be fully explained the objects of the invention are accomplished by transmitting from the airborne radar alternate long and short pulses but generally receiving and using for display radar returns from close range targets resulting from short pulses and using for display radar returns from long range targets resulting from long pulses. In this manner, the short range targets will be displayed well resolved while long range targets, although not well resolved will none the less be displayed. Thus, with reference again to FIG. 2, cells 12 and 14 are displayed as well defined separated traces or blips 12a and 14a, while cells 16 and 18 are not well resolved and actually merge into a single blip 17 comprised of returns 16a and 18a from cells 16 and 18 respectively. Thus, the present improvement provides an optimized display, considering pulse peak power limitations. In a radar system built and used, for targets within a first range only signal returns resulting from short radar pulses were used for display, while for targets outside a second range only signal returns resulting from long radar pulses were used for display. For targets lying between the aforementioned first and second range, signal returns resulting from both long and short radar pulses were used for display, as will be further explained below.

The invention can be better explained by reference to FIG. 3 which shows in typical Type A radar display format a display of targets or target returns on a single azimuth 26 radiating from a radar transmitter which is represented by origin 0. Three target returns 20, 22 and 24 are shown on azimuth 26 at increasing ranges $R_1$, $R_2$ and $R_3$ respectively. In other words, a radar pulse from the transmitter at origin 0 directed along the azimuth represented by line 26 is assumed to illuminate and obtain returns from targets located along that azimuth and specifically the targets respectively at ranges $R_1$, $R_2$ and $R_3$ from the transmitter.

As known in the art, resolution of the various target returns depends on the width of the illuminating radar pulse with target resolution increasing or improving as the illuminating pulsewidth decreases. It is desired, of course, to provide optimum target resolution on a radar display. However, also as known in the art, the energy content of a transmitted radar pulse is directly related to the width of the pulse, the amplitude being assumed to be constant. In addition, the power content of a transmitted radar pulse is rapidly dissipated with range as the pulse and the target returns from the pulse propagate through space. Thus, a relatively short transmitted radar pulse, which accordingly has a relatively low power content, may adequately illuminate a relatively close target whereby a sufficiently strong target return will be received and detected at the radar system receiver but may not have sufficient power to obtain a detectable return from a distant target.

The present invention provides that a radar system transmit relatively short pulses interspersed with relatively long pulses. These interspersed pulses are represented at FIG. 4A. FIGS. 4A and 4B are a set of line graphs drawn to a common time scale to comprise a timing chart which is helpful in explaining the workings of the invention. Referring to FIG. 4A, typical radar transmissions from a radar system made according to the present invention are comprised of short pulse transmissions, for example, pulses 28 and 32, interspersed with long pulse transmissions, for example, pulse 30. Of course, although not shown at FIG. 4A, subsequent to the transmission of short pulse 32 would be the transmission of a long pulse, then a short pulse, etc. Since as explained above, returns from targets illuminated by a short pulse and lying outside a certain range from the radar transmitter are not used while returns from targets outside that range as the result of illumination by a long pulse are used, the interpulse period subsequent to a short pulse, for example, interpulse period 34, can be shorter than the interpulse period 36 after a long pulse. In either case, the interpulse period preferably corresponds to the maximum range of interest for the particular pulse length. In a system actually built and tested the short pulses were of 6 microseconds duration, while long pulses were of 18 microseconds duration. The short pulse interpulse period, for example, interpulse period 34, corresponded to a range of approximately 80 nautical miles or, in other words, was 1.25 milliseconds long. The long pulse interpulse period, for example, interpulse period 36, corresponded to a range of approximately 320 nautical miles, which is 4.0 milliseconds. Typically, the radar, as shown in FIG. 4B, will receive returns 20a and 22a from targets 20 and 22 shown at FIG. 3 to be at ranges of $R_1$ and $R_2$ respectively, during interpulse period 34 as a result of short pulse transmission 28 and will subsequently receive returns 20b, 22b and 24b, returns 20b and 22b being from the same targets 20 and 22 of FIG. 3 while return 24b is from target 24 at a range of $R_3$ as a result of long pulse transmission 30. Of course, similar target returns will be received as a result of subsequent transmissions of the short and long pulses. It will be noticed that target returns 20a and 22a from targets 20 and 22 are relatively narrow and well defined since these target returns result from the illumination of the targets by the relatively short pulse 28. On the other hand, target returns 20b and 22b from the same targets 20 and 22 are wider or relatively less well defined since they result from illumination of the targets by the relatively long pulse 30.

In the present example it is assumed that the target producing target returns 20a and 20b lies within the above mentioned first range, the target producing target return 24b lies outside the above mentioned second range and that the target producing target returns 22a and 22b lies between the first and second ranges. It will be remembered that only target returns from targets lying inside the first range and resulting from short pulse illumination are used while only target returns from targets lying outside the second range and resulting from long pulse illumination are used while all target returns from targets lying between the first and second ranges are used whether illuminated by a short or long radar pulse. This is illustrated in FIG. 5 which shows target return data on azimuth 26 ready for display or other use by the radar system with target return 20a from a short radar pulse transmission, target return 24b from a long radar pulse transmission and target return 22ab which is a composite or combination signal which depends upon returns from long and short radar pulse transmissions.

Figure 6:
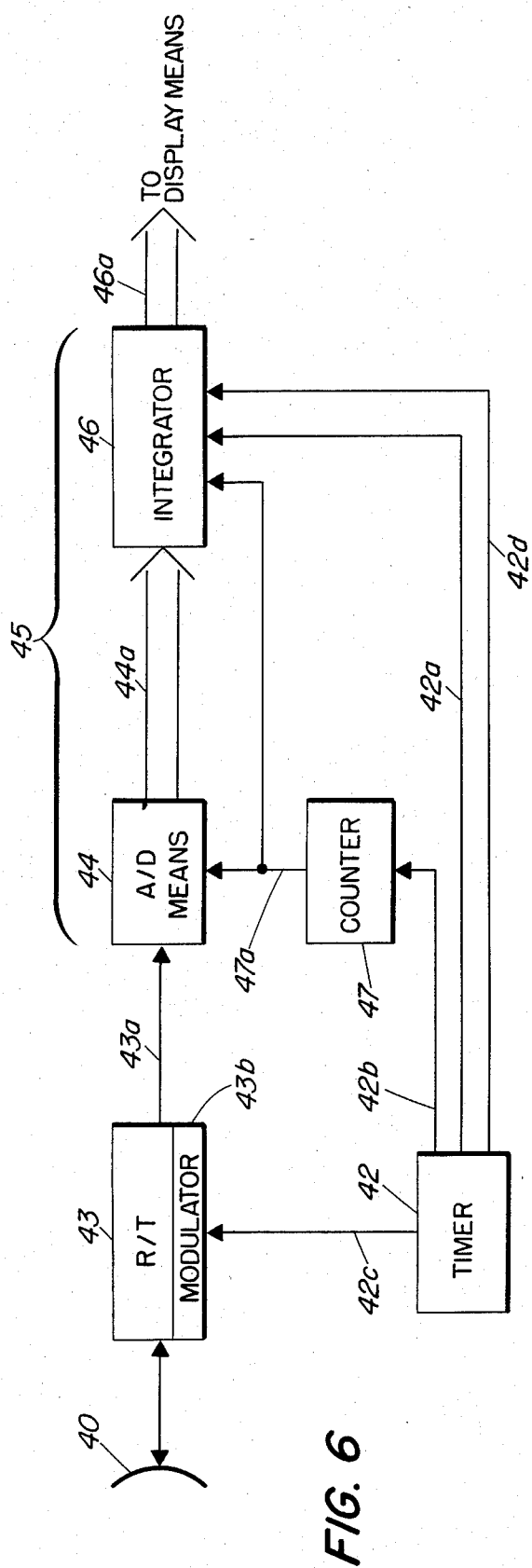
FIG. 6 is a block diagram of the invention.

Refer now to FIG. 6 which shows means for carrying out the present invention. In this and the following figures the solid data lines, such as lines 46a, indicate a plurality of parallel lines for carrying parallel signals, as should become clear as this description continues. FIG. 6, more particularly, shows the front end of a radar system, in block diagrammatic format, having a transmit/receive (R/T) unit 43 which applies radar pulses to an antenna 40 for radiation into the field of interest along the optical bore of the antenna in the conventional manner. It is to be understood that such radar pulses are generally those illustrated at FIG. 4A, that is, interspersed short and long pulses with appropriate interpulse periods as explained above. A timer 42 is programmed to provide drive pulses of the appropriate width on line 42c to a modulator 43b, which is part of the R/T unit 43, on an appropriate schedule to trigger the modulator to generate the pulses of FIG. 4A for antenna 40. Since the transmitted radar pulses generally coincide with the drive pulses FIG. 4A can also be taken to illustrate such drive pulses. Timer 42 is preferably simply a digital counter programmed to generate a pulse train corresponding to the pulse train of FIG. 4A.

Radar return signals from targets illuminated by a particular radar pulse transmitted by antenna 40 are subsequently incident on that antenna during the interpulse period and applied to the receiver portion of R/T unit 43 for conventional detection. The detected video is applied via line 43a to a video processor 45 and in particular to an analog-to-digital converter means 44 thereof.

Figure 7:
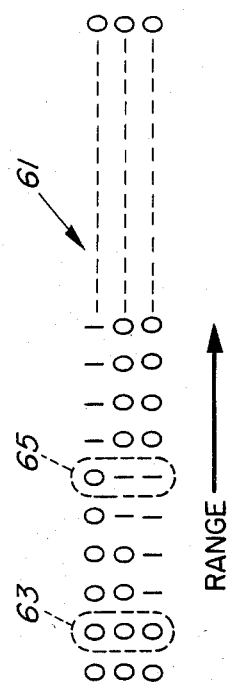
FIG. 7 illustrates the form of the digital words used in the present embodiment.

Simultaneously with the generation of a drive pulse on line 42c, timer 42 generates a pulse or signal on line 42b which is applied to reset and start a counter 47. This counter is programmed to generate a predetermined number of clock pulses which are applied via line 47a to A/D means 44 to digitize or reduce to digital format the video signal on line 43a. Counters and A/D means such as shown here are well known in the art and need not be exhaustively discussed. Briefly, the clock pulses on line 47a trigger the A/D means to chop the video signal into a consecutive plurality of digital microwords, each such microword corresponding and defining the instantaneous intensity of the video signal. As known to those in the art this microword corresponds to a particular range cell along the pointing axis of antenna 40. Typical microwords are shown at FIG. 7 where the microwords are three digits each and the aforementioned plurality of microwords resulting from a single transmitted pulse form a digital word, such as word 61. Microword 63,(000), for example, corresponds to the second range cell and shows that there is no signal return in that range cell above a certain threshold. Microword 65,(011), for another example, corresponds to the $6^{th}$ range cell and shows the signal intensity for that range cell.

Returning to FIG. 6, A/D means 44 includes in addition to a simple A/D converter a sensitivity timing control (STC) means which is generally conventional except it includes two sets of STC thresholds for the A/D converter rather than the conventional single set of thresholds. One set of thresholds is used to process (reduce to digital format) video signals resulting from short radar pulse transmissions and the other set to process video signals resulting from long radar pulse transmissions. A/D means 44 also includes a conventional penetration compensator which lowers the threshold level of the A/D converter to compensate for the reduction in return signal strength due to intervening targets. In other words, the STC thresholds and penetration compensator means adjust the A/D thresholds to compensate respectively for the decrease in return signal strength due to increased range and the decrease in return signal strength due to intervening targets so that the resulting digital word more correctly corresponds to the actual targets then being illuminated by a particular radar pulse.

The digital words from A/D means 44 are applied via line 44a to integrator 46 where successive digital words are integrated in accordance with the following rules:
 (a) Targets within a first range
  The short pulse transmission provides sufficient system gain to detect targets within this first range, thus only data or returns from short pulse transmissions are used for these targets. Returns for long pulse transmissions are not used for targets within the first range.

(b) Targets beyond a second range

It is highly unlikely that targets beyond the second range will return or echo a detectable signal in response to illumination by a short pulse transmission, thus normally only returns from long pulse transmissions are used.

(c) Targets between the first and second ranges

Target returns from both long and short pulse transmissions are used.

In a weather radar system actually built the first range above was 20 nautical miles (NM) and the second range was 80 NM. The radar system PRF format was such as to limit the range of short pulse returns to 80 NM thus, in a practical sense, even should a strong target at a range greater than 80 NM have returned a theoretically detectable signal, the PRF format would have precluded its use.

More will be said of integrator 46 below. It is sufficient for the present to say that the integrator output on line 46a taken over the entire field of interest will produce a display such as seen at FIG. 2 when applied to a suitable display means of the type known in the art. This known display means will generally comprise a reiteration memory in which will be stored in digital format one frame of data covering the entire field of interest. This data is read out of the reiteration memory at flicker-free rates onto a suitable display means such as a cathode ray tube for display.

Figure 8:
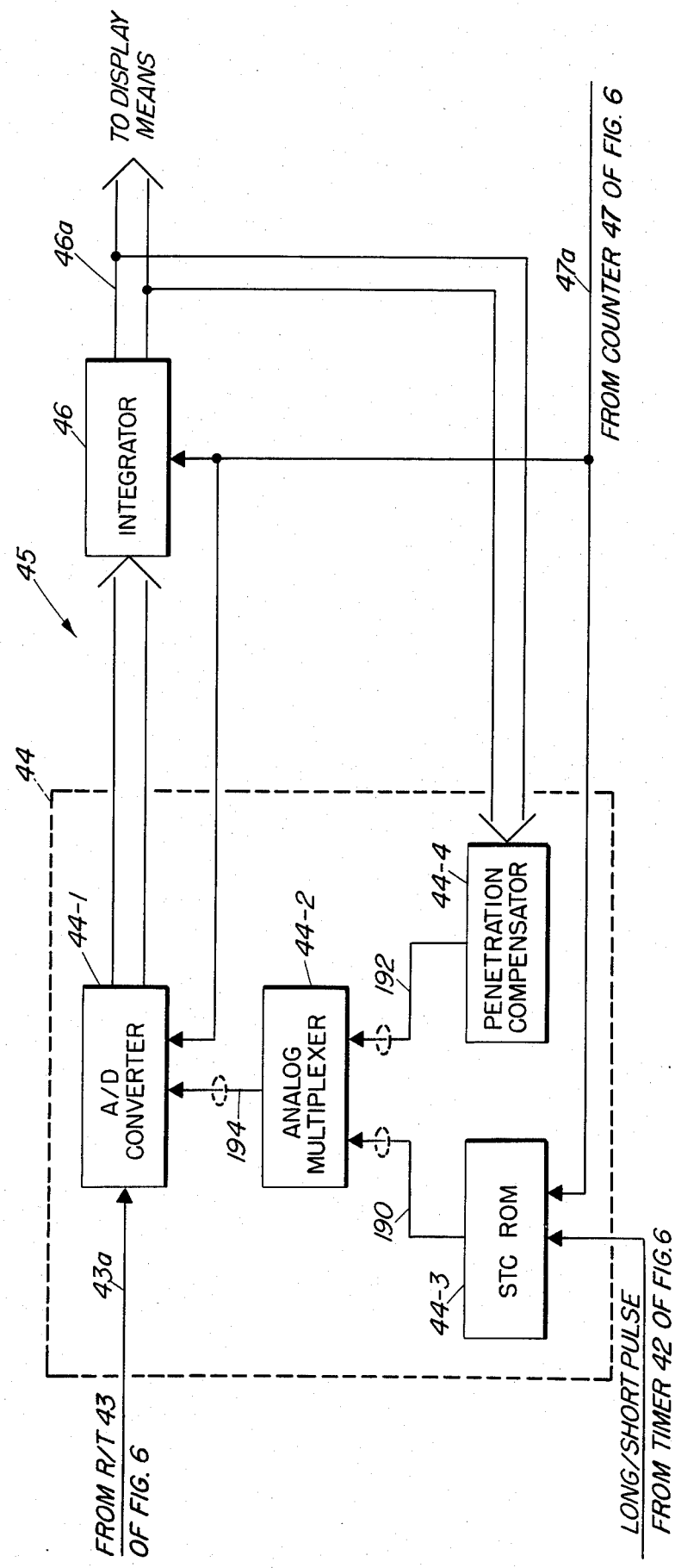
FIG. 8 is a more detailed block diagram of the video processor.

Refer now to FIG. 8 which shows video processor 45 in greater detail. A/D means 44 is seen to be comprised of A/D converter 44-1, analog multiplexer 44-2, STC read-only memory (ROM) 44-3 and penetration compensator 44-4. As mentioned above, all these elements are standard in the art except that STC-ROM 44-3 includes two sets of thresholds, one for short pulse returns and one for long pulse returns. Briefly, A/D converter 44-1, as stated above, converts the video return signal on line 43a into a digital word comprised of digital microwords which define the return signal intensity for the immediate previous pulse transmission in response to the clock pulses on line 47a. A/D converter 44-1 is a standard four comparator device with thresholds which vary in accordance with instructions from STC-ROM 44-3 and penetration compensator 44-4. These instructions, which are in digital format, are converted to analog and multiplexed or combined by analog multiplexer 44-2. Briefly, each comparator is referenced to a different threshold in a logical fashion with the video signal on line 43a being compared simultaneously in each comparator at each clock pulse with the reference. For each clock pulse each comparator determines whether its threshold reference is then being exceeded by the video signal. If so a digital "1" output is obtained from that comparator, otherwise a digital "0" is generated. The comparator outputs are combined by gating means to produce one digital microword of FIG. 7 for each clock pulse and the digital words of FIG. 7 for each predetermined plurality of clock pulses. A/D converter 44-1 will be described in greater detail below.

STC-ROM 44-3 simply comprises two sets of firmware-programmed sensitivity timing control thresholds which, in essence, lower the thresholds of A/D converter 44-1 in accordance with the clock pulses on line 47a, which of course, is in accordance with target range. By this means the thresholds for extended range target returns will be less than for returns from closer targets. The particular set of thresholds is chosen by a signal from timer 42 of FIG. 6. Refer to FIG. 9 which shows the thresholds and will make obvious the operation and function of A/D converter 44-1 and STC-ROM 44-3. There is seen two sets of thresholds, thresholds 68 for short pulse returns and thresholds 70 for long pulse returns. Assuming a long pulse has been transmitted, the signal from timer 42 of FIG. 6 will select thresholds 70 which will be generated in accordance with the clock pulses on line 47a, the individual clock pulses being designated, for example, 72a, 72b, etc. The threshold values are designated 74-77 and are shown as analog voltages to be applied to the comparators of A/D converter 44-1. That is, although the thresholds are stored in ROM 44-3 in digital format, they are shown at FIG. 9 after the digital format signal clocked from ROM 44-3 has been converted to analog format by analog multiplexer 44-2. It is assumed for this present description that there is no contribution from penetration compensator 44-4. In the event there is such a contribution the thresholds are further depressed as should become obvious as this description proceeds. The thresholds, as mentioned, are generated in response to the clock pulses and initially, at the first number of clock pulses, the thresholds are relatively high. As the clock pulses continue the thresholds decline so that, for example, at clock pulse 72h the thresholds are decreased. A video signal, for example signal 80, drawn over the thresholds illustrates the operation of A/D converter 44-1. Thus, while video signal is in the position between 80a and 80b with respect to the thresholds, that is, where video signal 80 is below the lowest threshold, any clock pulse then occurring will cause the A/D converter to generate a 000 microword. For clock pulses occurring while video signal 80 is between 80b and 80c, that is, when the video signal is between thresholds 76 and 77, A/D converter 44-1 generates a 001 microword. Of course, subsequent to short pulse transmission the resulting video signal is compared against threshold set 68 in the same manner. It may be noticed that the interpulse period after a short pulse transmission is shorter than the interpulse period after a long pulse transmission. This reflects the fact, as mentioned above, that the short pulse transmissions have a maximum effective range of about 80 NM, that is, no target return of short pulses are expected for targets over 80 NM in range. Since no returns are expected, the interpulse period after the short pulse transmissions can be truncated at a time equivalent to 80 NM range and the long pulse then transmitted as in this embodiment. Since the clock pulse rate is constant, there will be fewer clock pulses subsequent to the short pulse transmissions than subsequent to the long pulse transmissions and counter 47 of FIG. 6 is so programmed.

Returning now to FIG. 8, penetration compensator 44-4, a conventional element used in standard weather radars, decreases the thresholds from STC-ROM 44-3 to compensate for intervening weather targets. Briefly, penetration compensator sums the microwords issuing from integrator 46 on lines 46a (or optionally from A/D converter 44-1) during each digital word and causes the threshold signals from analog multiplexer 44-2 to be decreased as the sum increases indicating intervening targets. (It should be noted that line 190 from STC-ROM 44-3 and line 192 from penetration compensator 44-4 are actually four separate sets of electrical lines respectively, one for each digital threshold signal or penetration compensation signal as the case may be. In addition, there are four lines 194 connecting the individual threshold signals from analog multiplexer 44-2 respectively, to the four comparators of A/D converter 44-1.)

Figure 11:
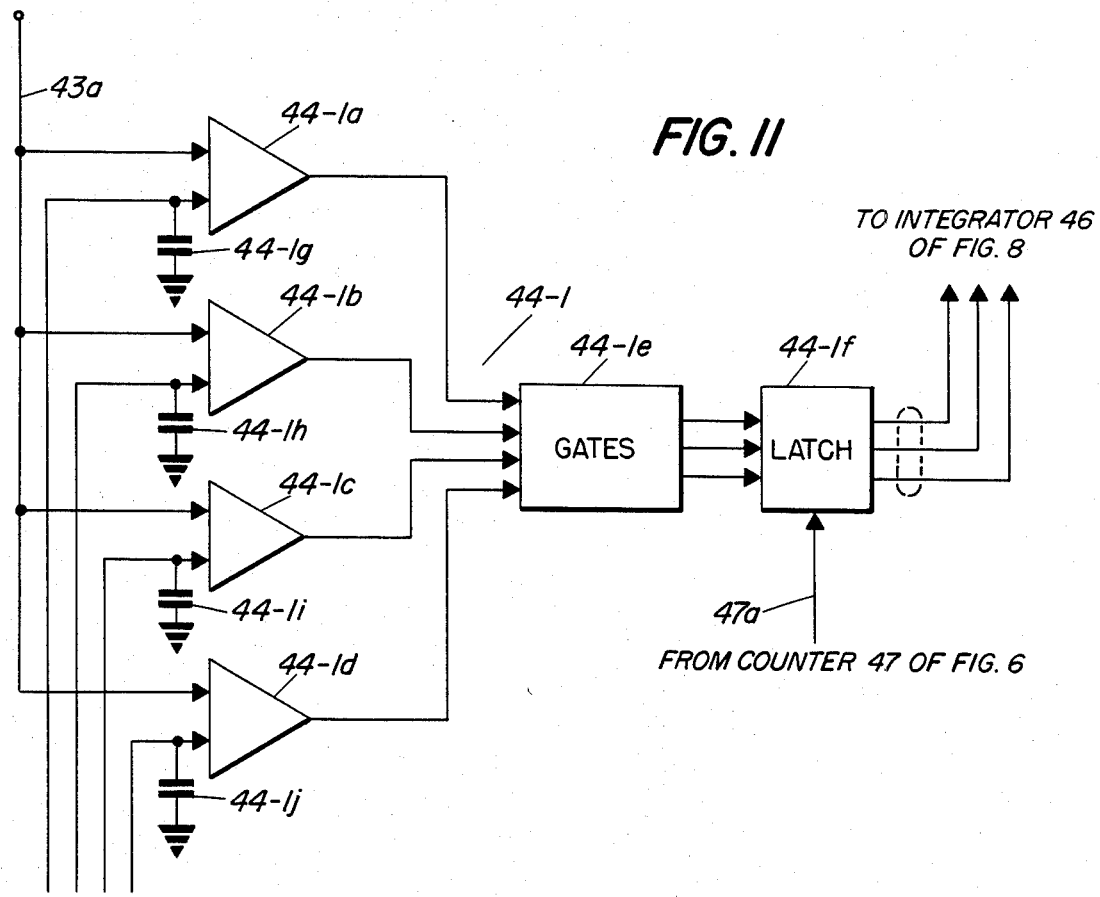
FIG. 11 is a more detailed block diagram of the A/D converter.

A/D converter 44-1, seen in greater detail in FIG. 11, reference to which should now be made, is comprised of comparator 44-1a, 44-1b, 44-1c and 44-1d, shunt capacitors 44-1g, 44-1h, 44-1i and 44-1j, gates 44-1e and latch 44-1f. The common video signal on line 43a is applied to one input terminal of each comparator, while the reference input terminal of each comparator is connected to receive respectively one of the above described analog reference threshold signals from analog multiplexer 44-2. The resulting comparator output signals, which here individually are either high or low signals, corresponding to a logical "1" or "0", depending on whether the video is above or below the reference or threshold applied to the particular comparator, are applied to a decoder in the form of logic gates 44-1e which reduces the four line input to a three line output. A latch 44-1f chops the three lines of data into the above mentioned microwords in response to clocks on line 47a from counter 47, the microwords and words being applied to integrator 46 via lines 44a.

Figure 10:
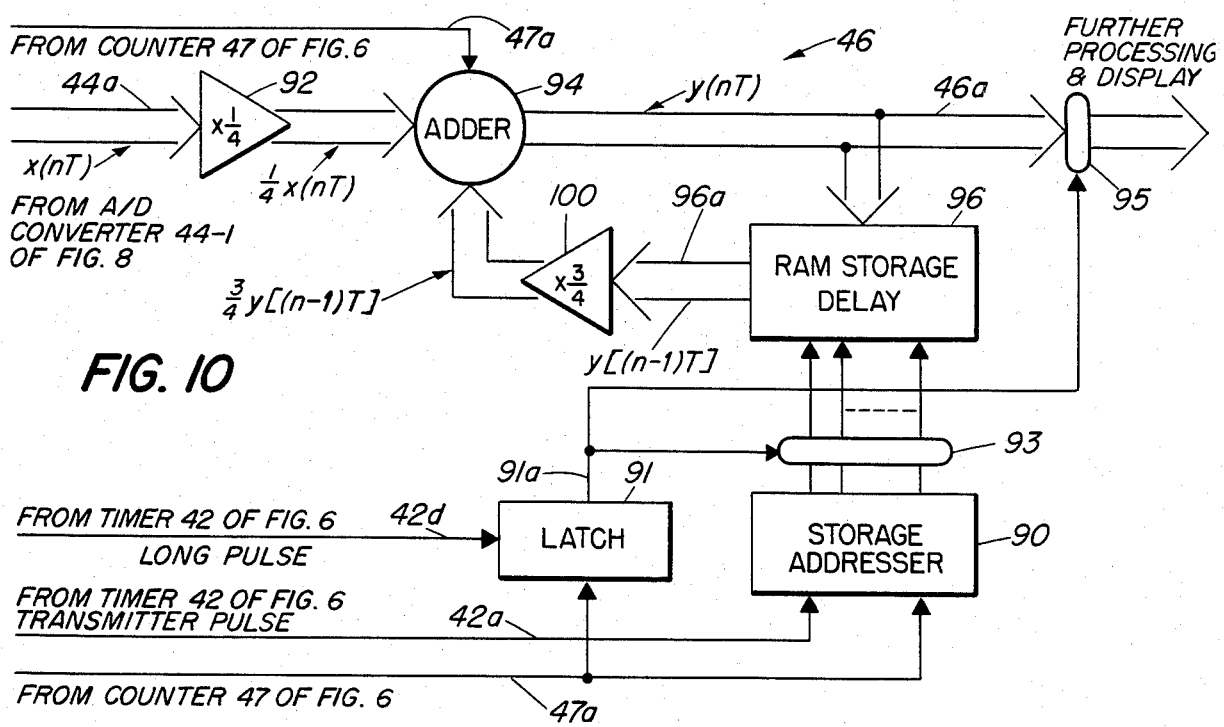
FIG. 10 is a more detailed block diagram of the integrator.

Refer now to FIG. 10 which shows integrator 46 in greater detail. The integrator is comprised of a $\times \frac{1}{4}$ operator 92, a $\times \frac{3}{4}$ operator 100, adder 94, storage addresser 90 and random access memory storage 96. The integrator is a digital filter having the structure:

$$y(nT) = \tfrac{1}{4}\chi(nT) + \tfrac{3}{4}y[(n-1)T]$$

where y(nT) is the 3-bit microword output at lines 46a corresponding to range cell T resulting from transmitted pulse n;

$\chi$(nT) is the 3-bit microword input at lines 44a corresponding to range cell T resulting from transmitted pulse n; and y[(n−1)T] is the 3-bit integrated microword output at line 96a corresponding to range cell T. The symbol (n−1) indicates that this word has been delayed one transmitted pulse period by RAM storage delay 96.

Stated in words, the integrator has the general function to add $\tfrac{1}{4}$ the value of each microword generated by A/D converter 44-1 to $\tfrac{3}{4}$ the value of the integrated value of the corresponding range cell. The above function is modified so that no returns from targets within a 20 NM range illuminated by a long pulse are processed by the integrator.

In a unit built the $\times \frac{1}{4}$ operator 92 is a conventional divider which shifts the data two places to the right thereby effectively dividing the data by 4, which of course, is identical to a $\times \frac{1}{4}$ function. The $\times \frac{3}{4}$ operator 100 is also conventional being a divide by 4 operator identical to that above and an adder to add the 2's complement of the result to the original. One skilled in the art knows that this is equivalent to subtracting $\tfrac{1}{4}$ of the whole from the whole to thereby produce $\tfrac{3}{4}$ of the whole.

RAM storage delay 96 is used as a delay to obtain y[(n−1)]. Storage 96 has sufficient capacity to store one complete digital word defining the complete radar return for one transmitted pulse. The individual cells of storage 96 are addressed in logical and cyclical sequence, three cells at a time for each clock pulse, by storage addresser 90, which is embodied as a read only memory (ROM). Addresser 90 steps through the various addresses for storage 96 in response to clock pulses on line 47a from counter 47 of FIG. 6. It will be remembered that these clock pulses define the range cells of the return signal. Addresser 90 is initialized by the trailing edge of the transmitted pulse (actually the modulator drive pulse) received from timer 42 of FIG. 6 via line 42a. In addition, a signal is received via line 42d from timer 42 of FIG. 6 indicating a long pulse transmission. This signal activates a latch 91 in the form of a counter which via line 91a opens gates 93 to interrupt the addresses to storage 96. The counter of latch 91 is sized to run out after the number of clock pulses corresponding to a range of 20 NM. In this manner target returns from targets within a 20 NM range resulting from a long pulse illumination are not processed by integrator 46. In addition, the signal on line 91a opens gating means 95 to interrupt the flow of data, and in particular the y(nT) signal described above, to further process and delay circuits of the prior art, which preferably includes a reiteration memory. This is done to block erroneous data resulting from short range target signal returns of long transmitted pulses.

Storage 96 is arranged to read-in and read-out data simultaneously as its cells are addressed. Thus, new integrated data, a microword, is read into a particular set of 3 memory cells corresponding to the proper range cell from lines 46a, while the old integrated data for the range cell is read-out on lines 96a. In addition, the new integrated data is available on lines 46a for further processing and display, if desired, by, for example, storing the data in a reiteration memory as previously discussed.

In the radar system actually built the short transmitted pulses were 6 microseconds duration and the long transmitted pulses were 18 microseconds duration.

Having described this embodiment of my invention, further modifications and alterations thereof should be apparent to those skilled in the art. I therefore claim the subject matter covered by the true spirit and scope of the appended claims.

The invention claimed is:

1. A radar system comprising:

transmitting means for radiating relatively short duration radar pulses alternately with relatively long duration radar pulses into a field of interest;

a radar receiver for producing first discrete video signals during a first interpulse period immediately subsequent to the transmission of a relatively short duration radar pulse, said first discrete video signals corresponding to radar returns resulting from the transmission of said relatively short duration radar pulse, and for producing second discrete video signals during a second interpulse period immediately subsequent to the transmission of a relatively long duration radar pulse, said second discrete video signals corresponding to radar returns resulting from the transmission of said relatively long duration radar pulse;

means for converting said first discrete video signals into first digital words comprised of elements of digital data and for converting said second discrete video signals into second digital words comprised of elements of digital data, each said element consisting of k digits representative of the amplitude of a video signal; and, means for integrating said first digital words with the latter portion only of said second digital words to produce a composite digital word representative of a composite radar return signal for the entire effective range of said radar, said latter portion of said second digital words corresponding to radar returns from targets lying beyond a range relatively close to said transmitting means.

2. The radar system of claim 1 wherein said means for integrating comprises:

means for storing said composite digital word;

first means for receiving and weighting by a factor A each element of said composite digital word as it is read out of said means for storing;

second means for receiving and weighting by a factor B each element of said digital words as they are clocked from said means for converting;

means for combining weighted elements from said second means with corresponding weighted elements from said first means to produce a new composite element of digital data;

addresing means for reading out of said means for storing said elements of said composite digital word and for writing into said means for storing said new composite elements of digital data;

means for clocking said elements of data from said means for converting;

timing means for generating a disable signal during the time between the radiation of said relatively long duration radar pulse and a predetermined time thereafter corresponding to said relatively close radar range; and means responsive to said disable signal for disabling the operation of said integrating means whereby during the period of said disable composite elements of digital data corresponding to radar targets within said relatively close range equivalent to said predetermined time are not renewed.

3. The radar system of claim 2 wherein A is equal to about ¾ and B is equal to about ¼.

* * * * *